United States Patent [19]
Sumitani

[11] Patent Number: 5,343,935
[45] Date of Patent: Sep. 6, 1994

[54] MULTIPLE TYPE AIR CONDITIONING APPARATUS

[75] Inventor: Shigeto Sumitani, Shizuoka, Japan

[73] Assignee: Kabushiki Kaisha Toshiba, Kawasaki, Japan

[21] Appl. No.: 756,313

[22] Filed: Sep. 6, 1991

[30] Foreign Application Priority Data

Sep. 14, 1990 [JP] Japan .................. 2-242460

[51] Int. Cl.$^5$ .................. F25B 29/00; F25B 13/00
[52] U.S. Cl. .................. 165/22; 165/29; 62/175; 62/184; 62/228.4; 62/324.6; 62/238.7; 237/213
[58] Field of Search .................. 62/324.6, 184, 228.4, 62/175, 238.7; 237/2 B; 165/22, 29

[56] References Cited

U.S. PATENT DOCUMENTS

| | | | |
|---|---|---|---|
| 4,620,423 | 11/1986 | Hopkinson et al. | 62/324.6 |
| 4,720,982 | 1/1988 | Shimizu et al. | 165/22 |
| 4,766,735 | 8/1988 | Gotou | 62/175 |
| 4,771,610 | 9/1988 | Nakashima et al. | 62/324.6 |
| 4,878,357 | 11/1989 | Sekigami et al. | 62/324.6 |
| 4,987,747 | 1/1991 | Nakamura et al. | 62/324.6 |
| 5,050,396 | 1/1991 | Ohkoshi et al. | 237/2 B |

FOREIGN PATENT DOCUMENTS

| | | | |
|---|---|---|---|
| 61-79950 | 4/1986 | Japan . | |
| 0258943 | 11/1987 | Japan | 165/22 |
| 62-258966 | 11/1987 | Japan . | |
| 63-238369 | 10/1988 | Japan . | |
| 0174844 | 7/1989 | Japan | 165/22 |
| 0118364 | 5/1990 | Japan | 165/22 |
| 0150672 | 6/1990 | Japan | 165/29 |
| 0178571 | 7/1990 | Japan | 165/29 |
| 0178572 | 7/1990 | Japan | 165/29 |

Primary Examiner—John K. Ford
Attorney, Agent, or Firm—Limbach & Limbach

[57] ABSTRACT

A multiple type air conditioning apparatus includes a refrigerant supply unit having a variable capacity compressor, at least two internal air conditioning units each having an internal heat-exchanger and a fan device, the internal heat-exchangers of the at least two air conditioning units being connected in parallel to one another, a first variable expansion valve for variably throttling refrigerant, fed from the compressor, flowing through one of the internal heat-exchangers, a second variable expansion valve for variably throttling refrigerant, fed from the compressor, flowing through the other internal heat-exchanger and a variable flow rate control unit arranged at one side of the internal heat-exchangers from which refrigerant flows into each internal heat-exchanger in a heating operation, for regulating a distribution of refrigerant flowing into each internal heat-exchanger. The first and second variable expansion valves, and the variable flow rate control unit are controlled to maintain the refrigerant super heating of each internal heat-exchanger at a respective constant value with accuracy in a cooling operation and to supply a sufficient amount of refrigerant to the refrigerating circuit thereby achieving an appropriate heating/cooling capacity.

6 Claims, 13 Drawing Sheets

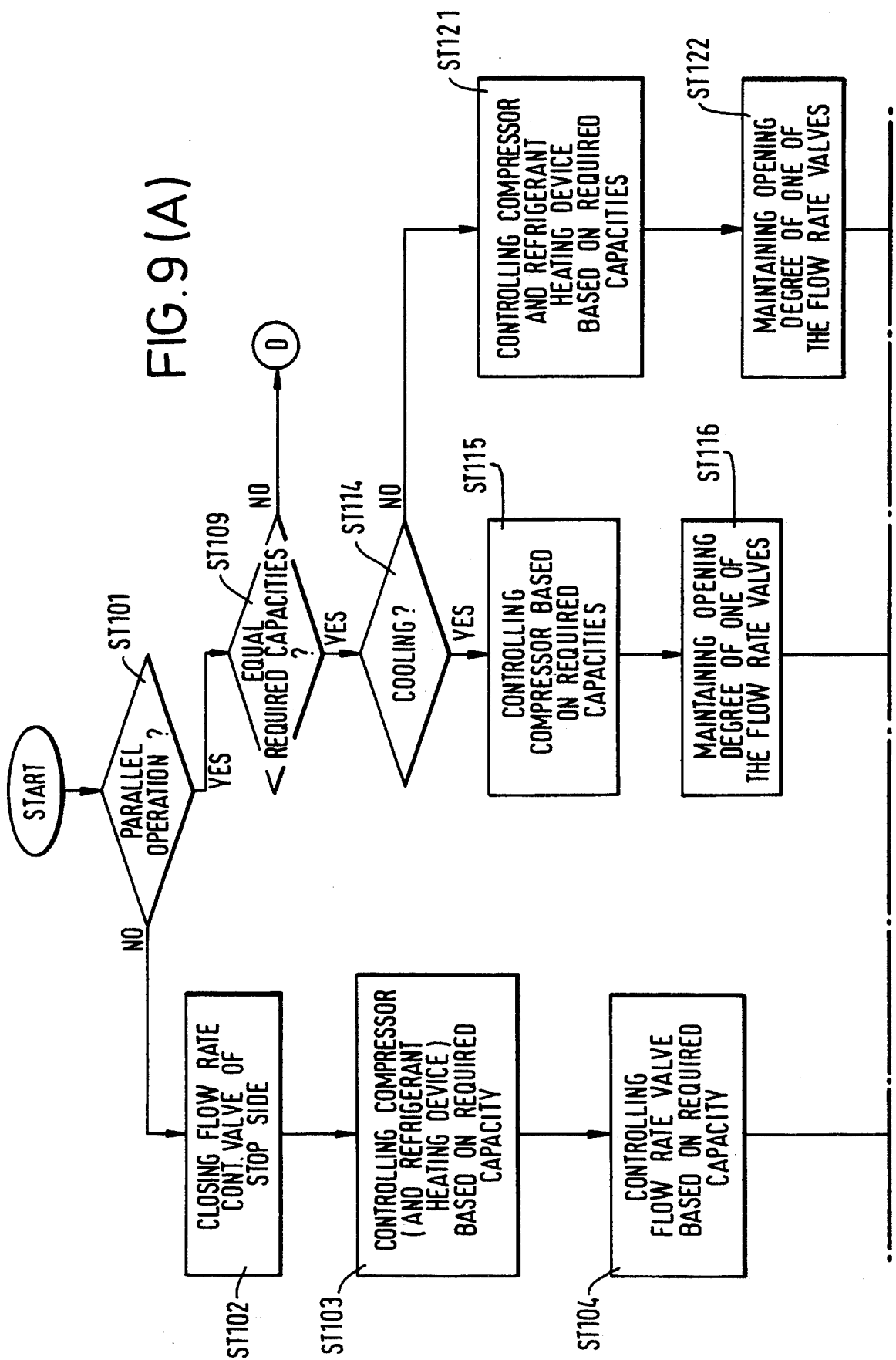

MULTIPLE TYPE AIR CONDITIONING APPARATUS

BACKGROUND OF THE INVENTION

1. Field of the Invention

The present invention relates, in general, to air conditioning apparatus. In particular, the invention relates to a multiple type air conditioning apparatus including one external unit (refrigerant supply unit) having a compressor, a heat-exchanger and a fan device, and a plurality of internal units (air conditioning units), each having a heat-exchanger and a fan device, connected in parallel to one another.

2. Description of the Related Art

In a conventional multiple type air conditioning apparatus typically including a common external unit and a plurality of internal units, the capacity of a compressor housed in the external unit is controlled based on the total amount of required heating/cooling capacities of the plurality of internal units. In addition, a flow rate control valve and an expansion valve are provided to the liquid flow pipe (the down-stream side of the heat-exchangers of the internal units in the heating operation) respectively connected to each internal unit, and a degree of opening of each flow rate control valve is controlled according to the required heating/cooling capacity of the corresponding internal units. In particular, in the cooling operation, the refrigerant super heating of each internal unit is maintained at a constant value by controlling the degree of opening of the corresponding expansion valves.

In the above-described conventional multiple type air conditioning apparatus, since the degree of opening of the flow rate control valve of each internal unit is independently controlled, the following problems may occur if a big difference in the required capacity exists among the plurality of internal units in the cooling operation. A sufficient amount of refrigerant flows to one of the plurality of internal units which requests a large capacity. However, it is difficult to control the refrigerant super heating of another internal unit requesting a capacity smaller than that of the one of the plurality of internal units at a constant value. This is because the amount of refrigerant flowing through another internal unit is originally small and a decrease in the refrigerant super heating may be limited, no matter what the degree of opening of the expansion valve of another internal unit is controlled. If the refrigerant super heating is in excess of the constant value, the entire refrigerating circuit becomes unstable and a desirable cooling capacity of the air conditioning apparatus may not be achieved.

On the other hand, in the heating operation, when the refrigerant flow rate control operation by the flow rate control valve is carried out at the down-stream side of each internal unit, a large amount of liquid refrigerant stays in another internal unit which requires a small capacity, and thus the amount of refrigerant circulating through the entire refrigerating circuit is insufficient. As a result, the temperature of refrigerant in the refrigerating circuit decreases and a desirable heating capacity is not obtained.

To solve the above-described problems, it is considered that the volume of refrigerant charged in the refrigerating circuit is increased beforehand. However, a liquid tank having a large capacity is required to store such an increased amount of refrigerant, and thus the external size of the apparatus is also increased.

On the other hand, if a sufficient heating capacity is obtained without increasing the amount of refrigerant, an increase in the rotational speed of the compressing motor is required resulting in an increase in the power consumption of the compressing motor.

SUMMARY OF THE INVENTION

Accordingly, it is an object of the present invention to maintain the refrigerant super heating of each internal unit at a constant value in the cooling operation thereby achieving a desirable cooling capacity in a multiple type air conditioning apparatus.

It is another object of the invention to achieve a desirable heating capacity of a multiple type air conditioning apparatus without increasing the external size of the apparatus and the power consumption of the apparatus.

To accomplish the above-objects, a multiple type air conditioning apparatus includes a refrigerant supply unit having a variable capacity compressor, a four-way valve, a heat-exchanger and a fan device, at least two air conditioning units each having a fan device and a heat-exchanger, a first variable expansion valve for variably throttling refrigerant flowing through one of the heat-exchangers of the at least two air conditioning units, a second variable expansion valve for variably throttling refrigerant flowing through the other heat-exchanger of the at least two air conditioning units, a variable flow rate controller arranged at one side of the heat-exchangers of the at least two air conditioning units from which refrigerant flows into each heat-exchanger in a heating operation for regulating a distribution of refrigerant flowing into each heat-exchanger of the at least two air conditioning units, and a main control section for controlling the capacity of the compressor based on the total amount of the required capacities of the at least two air conditioning units.

A refrigerant heating device may be arranged between the four-way valve and the first and second variable expansion valves to heat refrigerant when the heating operation is carried out.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings, wherein like reference numerals throughout the various figures denote like structure elements and wherein:

FIGS. 9(A) 9(B) and 9(C) are a flow-chart of the operation of the third embodiment.

DETAILED DESCRIPTION OF THE PREFERRED EMBODIMENTS

Figure 1:
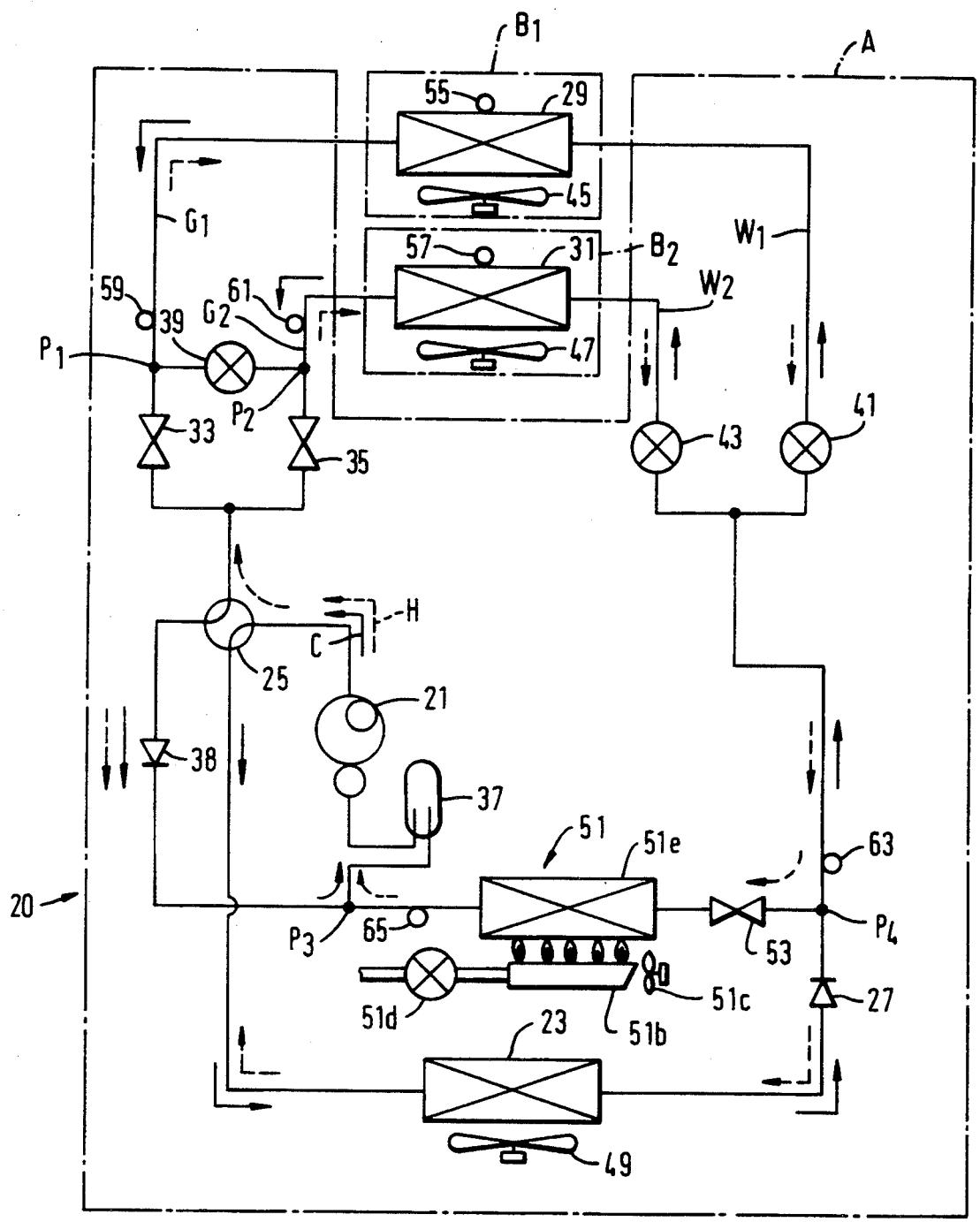
FIG. 1 is a diagram illustrating a refrigerating circuit of a first embodiment of the present invention.

Preferred embodiments of the present invention will now be described in more detail with reference to the accompanying drawings. However, the same numerals are applied to the similar elements in the drawings, and therefore the detailed descriptions thereof are not repeated.

A first embodiment of the present invention will be described with reference to FIGS. 1, 2, 3(A) and 3(B). As shown in FIG. 1, a multiple type air conditioning apparatus 20 includes an external unit A (refrigerant supply unit) and a plurality of internal units (air conditioning unit) B1 and B2 connected to external unit A. The output port of a compressor 21 housed in external unit A is connected to an external heat-exchanger 23 through a four-way valve 25. External heat-exchanger 23 is connected to a check valve 27. Check valve 27 is connected to a first internal heat-exchanger 29 housed in first internal unit B1 through a first liquid flow pipe W1 and is also connected to a second internal heat-exchanger 31 housed in second internal unit B2 through a second liquid flow pipe W2. First internal heat-exchanger 29 is connected to a first bidirectional valve 33 through a first gas flow pipe G1, and second internal heat-exchanger 31 is connected to a second bidirectional valve 35 through a second gas flow pipe G2. First and second bidirectional valves 33 and 35 are connected to an accumulator 37 through four-way valve 25 and check valve 38. Accumulator 37 is connected to the input port of compressor 21. An electronic flow rate control valve 39 (variable opening valve) is connected between a connecting point P1 of first internal heat-exchanger 29 and first bidirectional valve 33 and a connecting point P2 of second internal heat-exchanger 31 and second bidirectional valve 35. First and second electronic expansion valves 41 and 43 are respectively connected to the corresponding first and second liquid flow pipes W1 and W2. First and second fan devices 45 and 47 are respectively arranged close to the corresponding first and second internal heat-exchangers 29 and 31. An external fan device 49 is disposed close to external heat-exchanger 23.

One end of a refrigerant heating device 51 is connected to a connecting point P3 of check valve 38 and accumulator 37 and the other end thereof is connected to a connecting point P4 of check valve 27 and first and second electronic expansion valves 41 and 43 through a third bidirectional valve 53. Refrigerant heating device 51 includes a heat-exchanger 51a, a gas burner 51b arranged close to heat-exchanger 51a, a burner fan unit 51c and a proportional electric fuel gas flow rate control valve unit 51d. Refrigerant heating device 51 also includes an igniter 51e and a flame sensor 51f shown in FIG. 2. Thus, refrigerant flowing through heat-exchanger 51a is heated by gas burner 51b.

First and second heat exchanger temperature sensors 55 and 57 are respectively arranged on the corresponding first and second heat-exchangers 29 and 31.

First and second refrigerant temperature sensors 59 and 61 are respectively mounted on the corresponding gas flow pipes G1 and G2. A third refrigerant temperature sensor 63 is arranged on a pipe between the connecting point P4 and first and second electronic expansion valves 41 and 43 so that it is located close to the connecting point P4. A fourth refrigerant temperature sensor 65 is mounted on a pipe between heat-exchanger 51a and the connecting poing P3.

A control circuit of the above-described air conditioning apparatus will now be described.

External unit A includes an external control section 71 composed of a microcomputer and its peripheral circuits to control overall operations of external unit A. First and second electronic expansion valves 41 and 43, electronic flow rate control valve 39, proportional electric fuel gas flow rate control valve unit 51d, igniter 51e and flame sensor 51f are respectively connected to external control section 71. A fan motor 51M of burner fan unit 51c, four-way valve 25 and a fan motor 49M of external fan device 49 are also connected to external control section 71. First, second, third and fourth refrigerant temperature sensors 59, 61, 63 and 65 are respectively connected to external control section 71 and first, second and third bidirectional valves 33, 35 and 53 are also connected to external control section 71, respectively. An inverter circuit 73 is connected to external control section 71 to control the rotational speed of a compressor motor 21M. Inverter circuit 73 rectifies an AC voltage from a commercial power supply 75 and outputs an AC voltage having a prescribed frequency and voltage level responding to a command from external control section 71.

Figure 2:
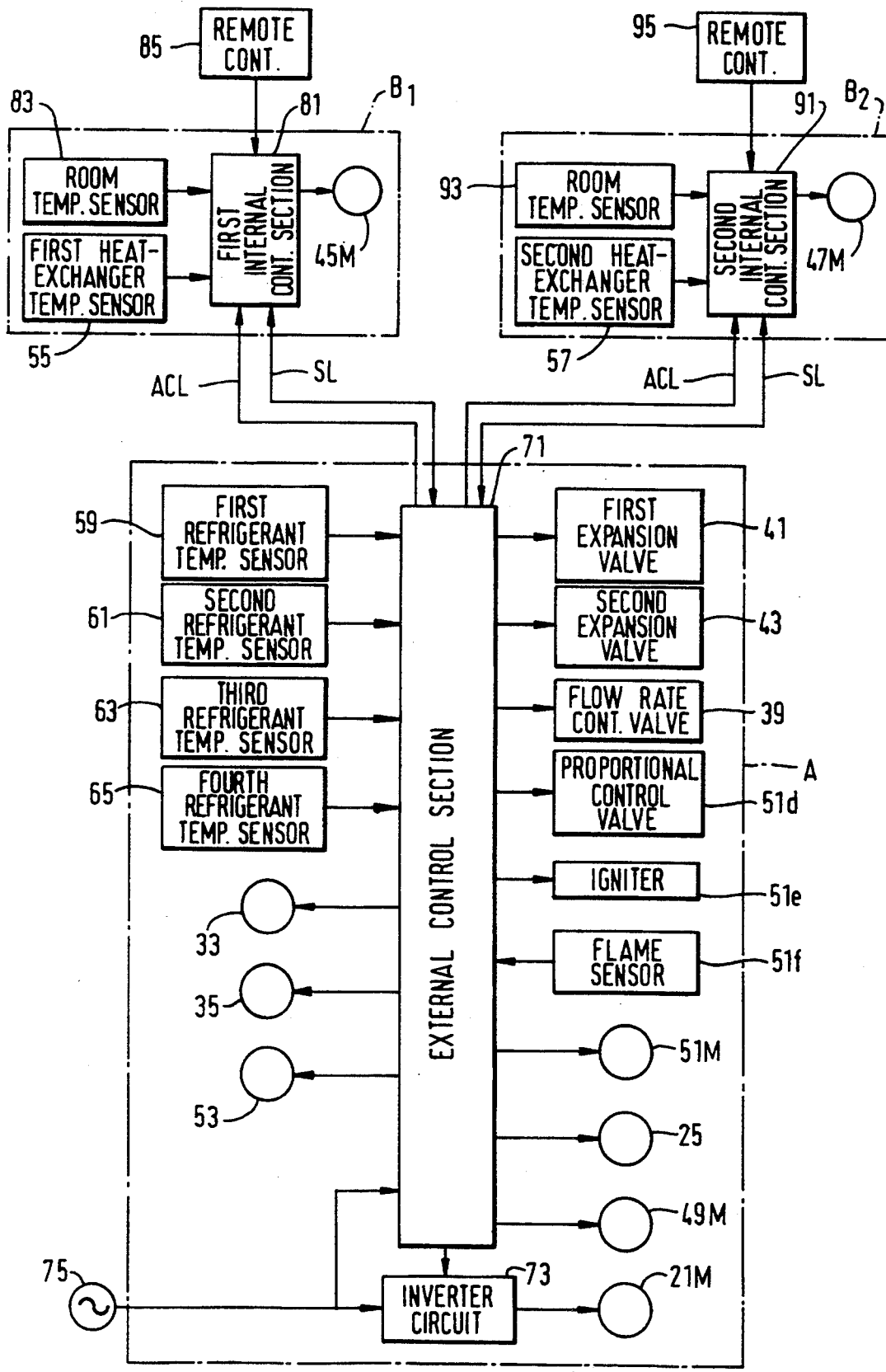
FIG. 2 is a block diagrams of a control circuit of the first embodiment.

As shown in FIG. 2, first internal unit B1 includes a first internal control section 81 to control overall operations of first internal unit B1. First internal unit B1 also includes a microcomputer and its peripheral circuits. A room temperature sensor 83 and first heat exchanger temperature sensor 55 are respectively connected to first internal control section 81, and a fan motor 45M of first fan device 45 is also connected to first internal control section 81. An operation mode command from a first operation remote controller 85 is input to first internal control section 81. First internal control section 81 and external control section 71 are connected with a power line ACL and a serial signal line SL.

Second internal unit B2 includes a second internal control section 91 composed of a microcomputer and its peripheral circuits to control overall operations of second internal unit B2. A room temperature sensor 93 and second heat exchanger temperature sensor 57 are individually connected to second internal control section 91, and a fan motor 47M of second fan device 47 is also connected to second internal control section 91. An operation mode command output from a second operation remote controller 95 is input to second internal control section 91. Second internal control section 91 is connected to external control section 71 through a power line ACL and a serial signal line SL.

First and second internal control sections 81 and 91 respectively provide the following functions:

1. The first function selectively transmits an operation mode command from first (second) operation remote controller 85 (95) or set room temperature data to external control section 71 with serial signals synchronized with a power voltage;

2. The second function detects a difference, i.e., air conditioning load, between the set room temperature of first (second) operation remote controller 85 (95) and a detected temperature, i.e., an actual room temperature, from first (second) room temperature sensor 83 (93) and sends the difference, as a required capacity, to external control section 71 with serial signals synchronised with a power voltage; and 3. The third function transmits detected temperature data fed from first(second) heat exchanger temperature sensor 55 (57) with serial signals synchronised with a power voltage.

External control section 71 provides the following functions:

1. The first main function to carry out a cooling operation in response to the cooling operation mode command from first or second internal unit B1 or B2 wherein refrigerant fed from compressor 21 flows through four-way valve 25, external heat-exchanger 23, check valve 27, first or second electronic expansion valve 41 or 43, first or second internal heat-exchanger 29 or 31, first or second bidirectional valve 33 or 35, four-way valve 25, check valve 38 and accumulator 37 along the direction indicated by a solid arrow C in FIG. 1;

2. The second main function is to control the capacity of compressor 21 by varying the output frequency F of inverter circuit 73 in accordance with the total of the required capacities of first and second internal units B1 and B2 in the cooling operation;

3. The third function is to control the operations of first and second bidirectional valves 33 and 35 in the cooling operation so that one of the first and second bidirectional valves, e.g., 33 corresponding to one of the first and second internal units, e.g., B1 having a required capacity greater than that of the other internal unit B2 is opened and the other bidirectional valve 35 is closed;

4. The fourth main function is to control a degree of opening of flow rate control valve 39 in the cooling operation so that a difference (or ratio) of refrigerant evaporation temperatures Tc1 and Tc2 of first and second internal units B1 and B2 corresponding to detection temperatures of first and second heat exchanger temperature sensors 55 and 57 achieves a prescribed relationship (a value corresponding to a difference or a ratio of required capacities of first and second internal units B1 and B2) based on the required capacities of first and second internal units B1 and B2;

5. The fifth main function which is to detect a refrigerant super heating of each first and second internal units B1 and B2 (a difference between the detected temperature of first (second) heat exchanger temperature sensor 55(57) and the detected temperature of first (second) refrigerant temperature sensor 59 (61) in the cooling operation;

6. The sixth main function is to control the degree of openings of first and second electronic expansion valves 41 and 43 so that the refrigerant super heating of each first and second internal units B1 and B2 detected by first and second heat exchanger temperature sensors 55 and 57 is regulated at a constant value;

7. The seventh main function is to carry out a heating operation in response to the heating operation mode command from first or second internal unit B1 or B2 wherein refrigerant fed from compressor 21 flows through four-way valve 25, first or second bidirectional valve 33 or 35, first or second internal heat-exchanger 29 or 31, first or second electronic expansion valve 41 or 43, third bidirectional valve 53, heat-exchanger 51a of refrigerant heating device 51 and accumulator 37 along the direction indicated by a dotted arrow H in FIG. 1;

8. The eighth main function is to control the capacity of compressor 21 (output frequency F of inverter circuit) and the amount of heating of refrigerant heating device 51 (amount of combustion of gas burner 51b) based on the total required capacities of first and second internal units B1 and B2 in the heating operation;

9. The ninth main function is to control operations of first and second bidirectional valve 33 and 35 in the heating operation so that one of the first and second bidirectional valves, e.g., 33 corresponding to one of the first and second internal units, e.g., B1 having a required capacity greater than that of the other internal unit B2 is opened and the other bidirectional valve 35 is closed;

10. The tenth main function is to control a degree of opening of flow rate control valve 39 in the heating operation so that a difference (or ratio) of temperatures Tg1 and Tg2 (temperatures detected by first and second refrigerant temperature sensors 59 and 61) of refrigerant flowing into first and second internal heat-exchangers 29 and 31 achieves a prescribed relationship (a value corresponding to a difference or a ratio of required capacities of first and second internal units B1 and B2) based on the required capacities of first and second internal units B1 and B2;

11. The eleventh main function is to detect the refrigerant super heating of heat-exchanger 51a of refrigerant heating device 51 (a difference between the detected temperature of third refrigerant temperature sensor 63 and the detected temperature of fourth refrigerant temperature sensor 65) in the heating operation; and 12. The twelfth main function which simultaneously controls the degree of openings of first and second electronic expansion valves 41 and 43 the same amount so that the detected refrigerant super heating of heat-exchanger 51a of refrigerant heating device 51 is regulated at a constant value.

Figure 3A:
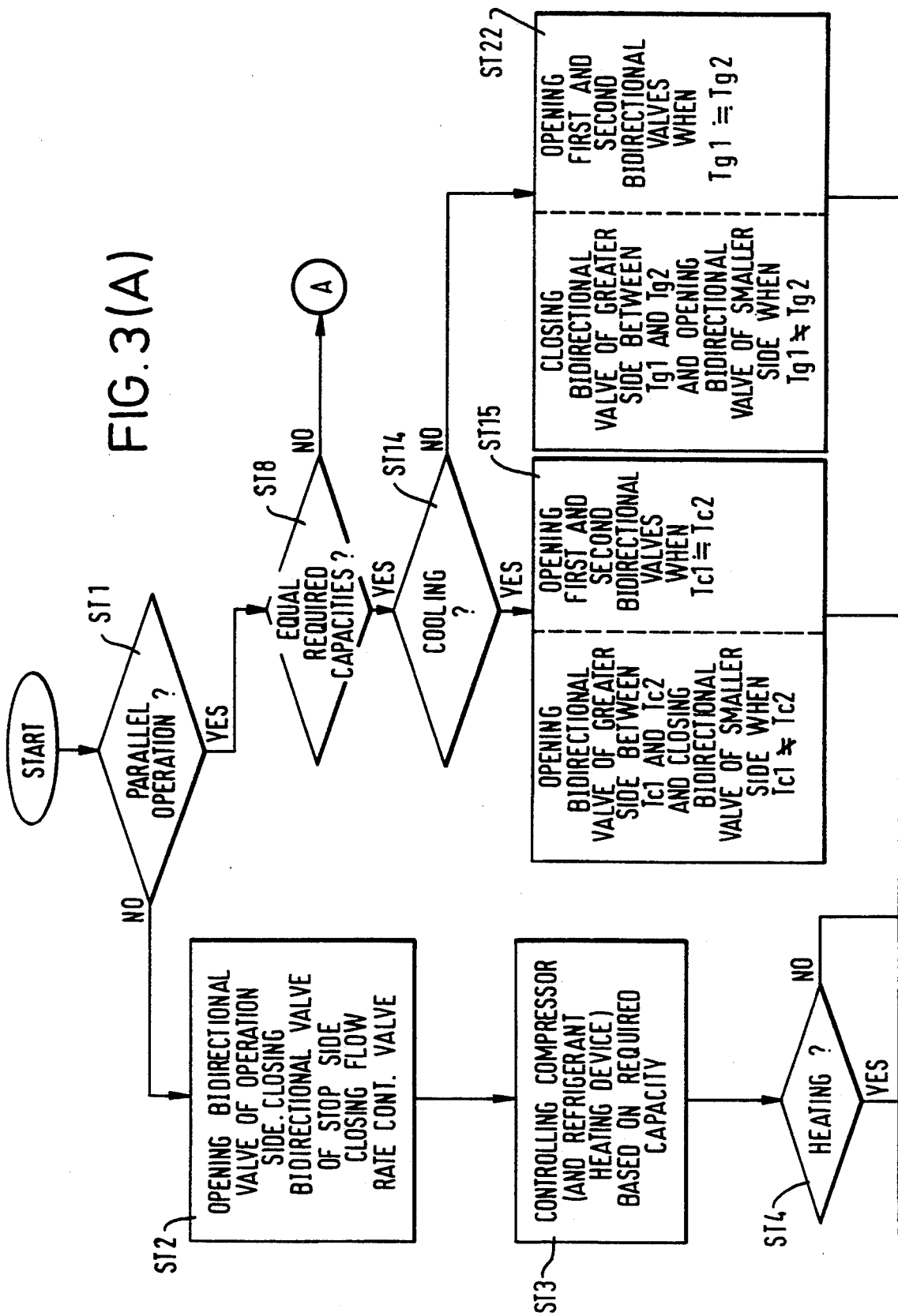
FIGS. 3(A) 3(B) and 3(C) are a flow-chart of the operation of the first embodiment.
Figure 3B:
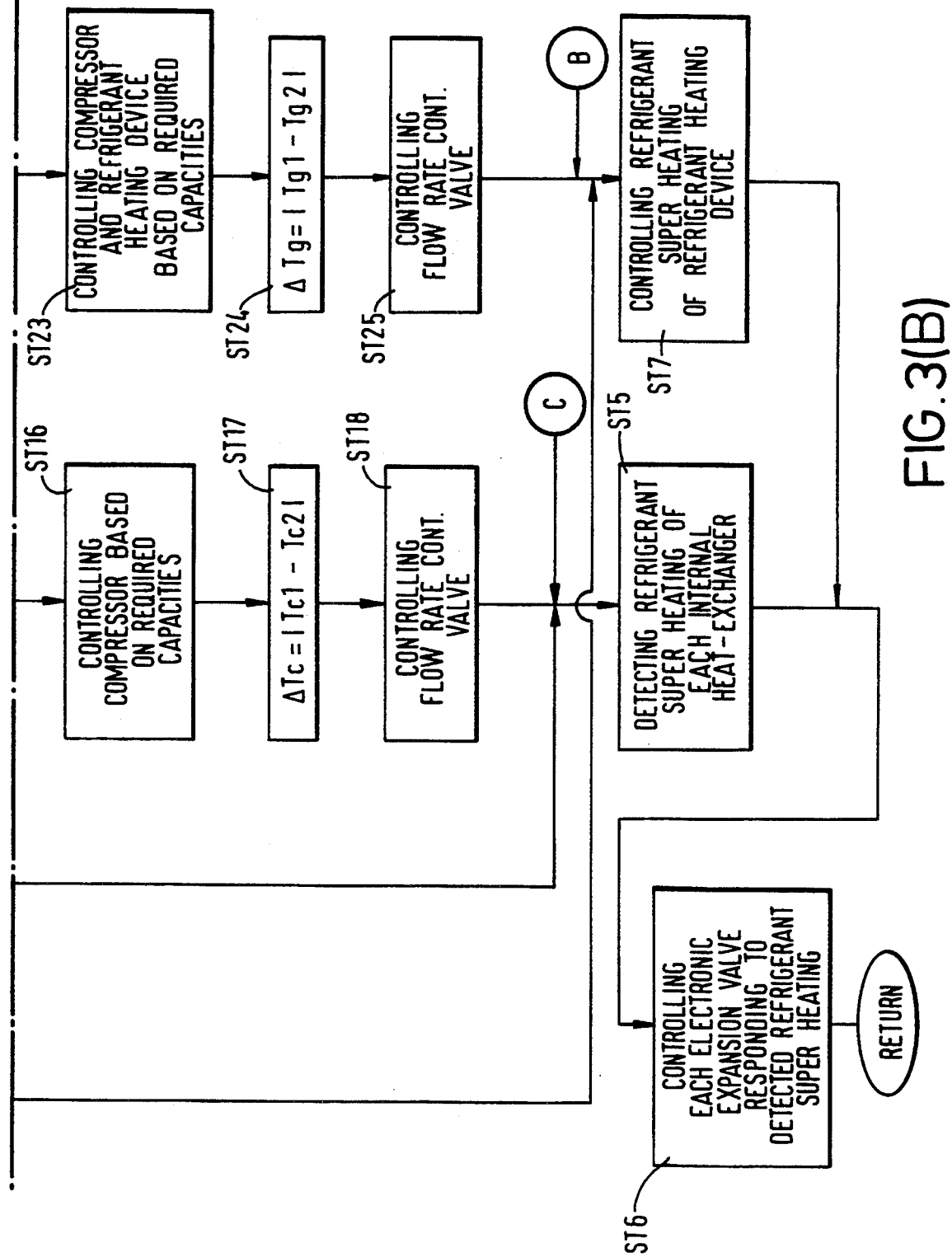
Figure 3C:
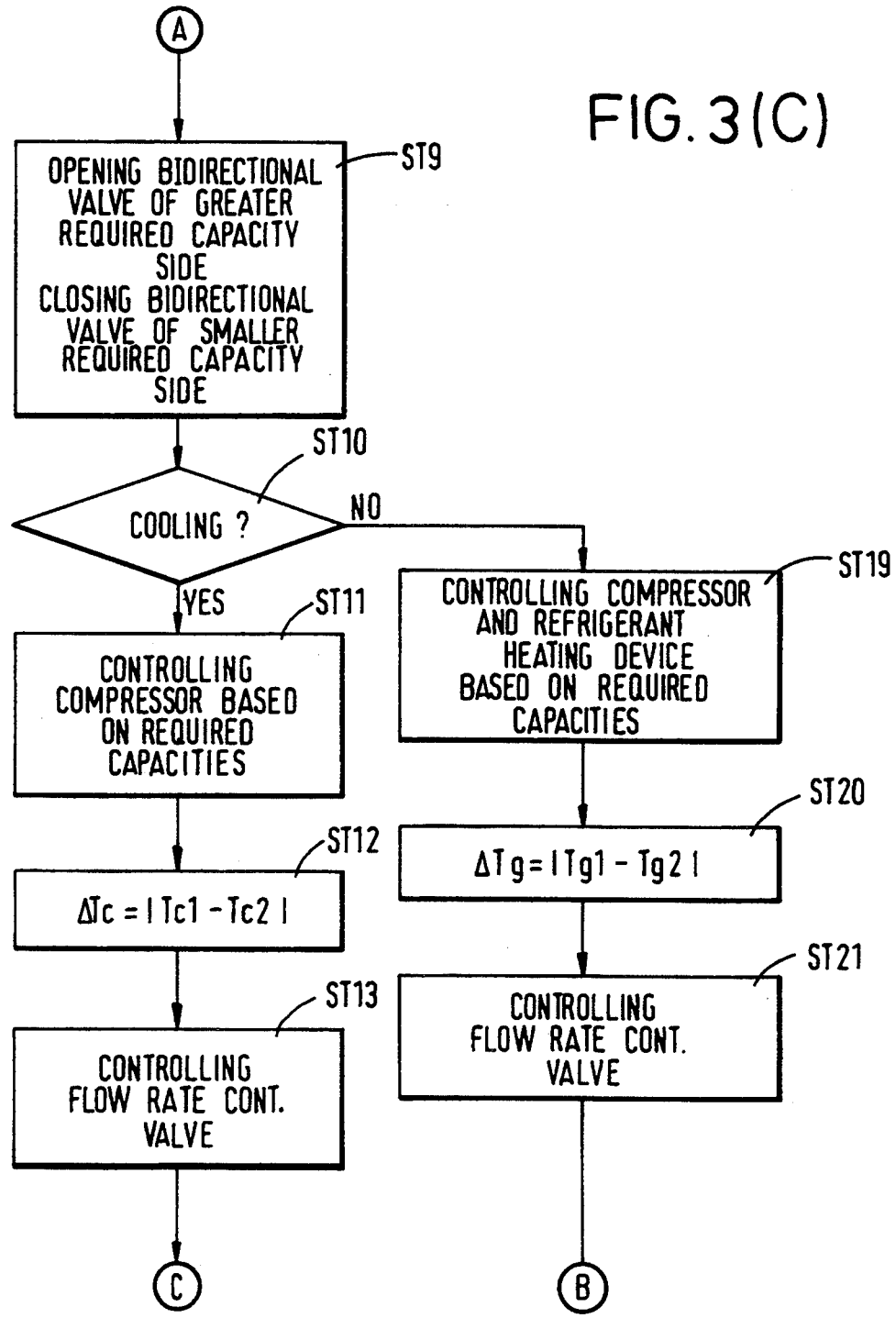

The operation of the above-described first embodiment will now be described with reference to FIGS. 3(A) and 3(B).

A first mode will be described supposing that a cooling operation mode and a desired room temperature are set in first internal unit B1 through operation remote controller 85 and the operation of second internal unit B2 is not requested. In step ST1, since only the operation of first internal unit B1 is requested (a single operation), the NO-path is taken. In step ST2, first bidirectional valve 33 of an actuated unit side (first internal unit B1) is opened and second bidirectional valve 35 of a stop unit side (second internal unit B2) is closed. Flow rate control valve 39 is also closed. Compressor 21 is driven to carry out a single cooling operation. Refrigerant fed from compressor 21 flows through four-way valve 25, external heat-exchanger 23, first electronic expansion valve 41, first internal heat-exchanger 29 of first internal unit B1, first bidirectional valve 33, four-way valve 25, check valve 38 and accumulator 37 along the direction indicated by a solid arrow C in FIG. 1.

In step ST3, the capacity of compressor 21 is controlled based on the required capacity of first internal unit B1. In step ST4, since a cooling operation has been set in first internal unit B1, the NO-path is taken. The refrigerant super heating of first internal heat-exchanger 29 (a difference between the detected temperatures of first heat-exchanger temperature sensor 55 and first refrigerant temperature sensor 59) is detected in step ST5. A degree of opening of first electronic expansion valve 41 is controlled to regulate the detected refrigerant super heating at a constant value in step ST6.

A second mode will be described supposing that a heating operation and a desired room temperature ape set in first internal unit B1 and the operation of second internal unit B2 is not requested. In step ST1, the NO-path is taken. In step ST2, first bidirectional valve 33 is opened and second bidirectional valve 35 is closed. Flow rate control valve 39 is also closed. Compressor 21 is driven to carry out a single heating operation. Refrigerant fed from compressor 21 flows through four-way valve 25, first bidirectional valve 33, first internal heat-exchanger 29, first electronic expansion valve 41, third bidirectional valve 53, refrigerant heating device 51 and accumulator 37 in the direction indicated by a dotted arrow H in FIG. 1.

In step ST3, the capacity of compressor 21 and the heating amount of refrigerant heating device 51 are respectively controlled based on the required capacity of first internal unit B1. Since a heating operation has been set in first internal unit B1, the YES-path is taken in step ST4. The refrigerant super heating of refrigerant heating device 51 is detected in step STT. A degree of opening of first electronic expansion valve 41 is controlled to regulate the detected refrigerant super heating at a constant value.

A third mode will be described supposing that a cooling operation mode and a desired room temperature are set in first and second internal units B1 and B2 through the corresponding operation remote controllers 85 and 95.

In step ST1, since operations of first and second internal units B1 and B2 are requested (a parallel operation), the YES-path is taken. In step ST8, if the required capacities of first and second internal units B1 and B2 are different from one the other, the NO-path is taken. Otherwise, the YES-path is taken. When the NO-path is taken in step ST8, one of the first and second bidirectional valves, e.g., 33 corresponding to one of the first and second internal units, e.g., B1 having a required capacity greater than that of the other internal unit B2 is opened and the other bidirectional valve 35 is closed in step ST9. In step ST10, since a cooling operation has been set in both first and second internal units B1 and B2, the YES-path is taken. Compressor 21 is driven to carry out a parallel cooling operation. Refrigerant fed from compressor 21 flows through four-way valve 25, external heat-exchanger 23, first and second electronic expansion valves 41 and 43, first and second internal heat-exchangers 29 and 31, flow rate control valve 39, first bidirectional valve 33, four-way valve 25, check valve 38 and accumulator 37 along the direction indicated by a solid arrow C in FIG. 1. At this time, the capacity of compressor 21 is controlled through inverter circuit 73 in accordance with the total of required capacities of first and second internal units B1 and B2 in step ST11. In step ST12, the absolute value ΔTc of a difference between refrigerant evaporation temperatures Tc1 and Tc2 of first and second internal units B1 and B2 detected by the corresponding first and second heat-exchanger temperature sensors 55 and 57 is found. A degree of opening of flow rate control valve 39 is controlled to regulate absolute value ΔTe at a constant value corresponding to the ratio of the required capacities of first and second internal units B1 and B2 in step ST13. Thus, the amount of refrigerant flowing through second heat-exchanger 31 of second internal unit B2 having a smaller required capacity compared with that of first internal unit B1 is adjusted at a suitable value corresponding to the required capacity of second internal unit B2. Furthermore, the amount of refrigerant flowing through first heat-exchanger 29 of first internal unit B1 is also regulated at a suitable value corresponding to the required capacity of first internal unit B1. After step ST13 is executed, the above-described steps ST5 and ST6 are executed. The refrigerant super heatings of first and second heat-exchangers 29 and 31 are detected and a degree of opening of first and second electronic expansion valves 41 and 43 are respectively regulated to adjust the above-described detected refrigerant super heatings at corresponding constant values. At this time, since a sufficient amount of refrigerant flows through first heat-exchanger 29 of first internal unit B1 having a greater required capacity compared with that of second internal unit B2, the control of the refrigerant super heating is effectively carried out by first electronic expansion valve 41 and thus the refrigerant super heating of first heat-exchanger 29 is always maintained at a constant value. Furthermore, since a sufficient amount of refrigerant also flows through second heat-exchanger 31 of second internal unit B2 having a smaller required capacity, the control of the refrigerant super heating by second electronic expansion valve 43 is effectively carried out and thus the refrigerant super heating of second heat-exchanger 31 is also maintained at a constant value. As a result, the operation of the refrigerating circuit shown in FIG. 1 is stable and a desirable cooling capacity can be achieved.

A fourth mode will be described supposing that a cooling operation mode and a desired room temperature are set in first and second internal units B1 and B2 through the corresponding operation remote controllers 85 and 95, and required capacities of first and second internal units B1 and B2 are equal to one the other. In this case, the YES-path is taken in step ST8 and also the YES-path is taken in step ST14. In step ST15, the refrigerant evaporation temperatures Tc1 and Tc2 of first and second internal heat-exchangers 29 and 31 detected by the corresponding first and second heat-exchanger temperature sensors 55 and 57 are respectively watched. If the refrigerant evaporation temperature Tc1 of first internal unit B1 is greater than that Tc2 of second internal unit B2, first bidirectional valve 33 of first internal unit B1 side is closed and second bidirectional valve 35 of second internal unit B2 side is opened. The open/close relationship of first and second bidirectional valves 33 and 35 is reverse to that in the case wherein the required capacities of first and second internal units B1 and B2 are different from one another. However, if the refrigerant temperature Tc1 is equal to the refrigerant temperature Tc2, first and second bidirectional valves 33 and 35 are opened. In step ST16, the capacity of compressor 21 is controlled based on the total of the required capacities of first and second internal units B1 and B2. The absolute value ΔTc of a difference between the refrigerant evaporation temperatures Tc1 and Tc2 of first and second internal heat-exchanger 29 and 31 is found in step ST17, and a degree of opening of flow rate control valve 39 is regulated to adjust the absolute value ΔTc at zero in step ST18. Thus, a suitable amount of refrigerant is respectively provided to first and second internal units B1 and B2. After that, the above-described steps ST5 and ST6 are executed. The refrigerant super heating of each first and second internal heat-exchangers 29 and 31 is detected in step ST5. A degree of opening of each first and second electronic expansion valves 41 and 43 is controlled to regulate the corresponding detected refrigerant super heatings at a constant value in step ST6.

A fifth mode will be described supposing that a heating operation mode and respective desired room temperatures are set in first and second internal unit B1 and B2 and required capacities of first and second internal units B1 and B2 are different from one another. In step ST1, the YES-path is taken, and the NO-path is taken in step ST8. After executing step ST9, the NO-path is taken in step ST10. In step ST19, the capacity of compressor 21 and the heating amount of refrigerant heating device 51 are respectively controlled in accordance with the total of the required capacities of first and second internal units B1 and B2. Temperatures Tg1 and Tg2 of refrigerant flowing into respective first and second internal heat-exchangers 29 and 31 are respectively detected by the corresponding first and second refrigerant temperature sensors 59 and 61. An absolute value $\Delta$Tg of a difference between refrigerant temperatures Tg1 and Tg2 is found in step ST20, and a degree of opening of flow rate control valve 39 is controlled to regulate the absolute value $\Delta$Tg at a constant value corresponding to a ratio of the required capacities of first and second internal units B1 and B2 in step ST21. After that, the above-described steps ST7 and ST6 are carried out. The refrigerant super heating of heat-exchanger 51a of refrigerant heating device 51 (a difference between detected temperatures of third and fourth refrigerant temperature sensors 63 and 65) is detected, and a degree of opening of each first and second electronic expansion valves 41 and 43 is simultaneously controlled at a same amount to regulate. the detected refrigerant super heating at a constant value.

As described above, since a suitable amount of refrigerant is respectively provided to first and second internal heat-exchangers 29 and 31, a large amount of refrigerant does not stay in one of the first and second internal heat-exchanger, e.g., 29 whose internal unit B1 has a smaller required capacity compared with the other internal unit B2, and a shortage of refrigerant flowing through the refrigerating circuit shown in FIG. 1 does not occur. Thus, decrease in the temperature of refrigerant flowing through the refrigerating circuit can be avoided and a sufficient heating capacity can be obtained. In addition, since a sufficient amount of refrigerant flows through the refrigerating circuit, an excess amount of refrigerant to be charged is not needed in the refrigerating circuit beforehand and an accumulator having a large capacity is not required. Thus, an increase in the external size of the air conditioning apparatus 20 is avoided. An increase in the manufacturing cost is also avoided. Since a sufficient amount of refrigerant flows through the refrigerating circuit of air conditioning apparatus 20, an increase in the rotational speed of compressor motor 21M is not needed and thus an increase in the power consumption of compressor motor 21M is avoided.

A sixth mode will be described supporsing that required capacities of first and second internal units B1 and B2 ape equal to one the other in a parallel heating operation.

In step ST1, the YES-path is taken and the YES-path is also taken in step ST8. In step ST14, since the heating operation is set in first and second internal units B1 and B2, the NO-path in taken. In step ST22, temperatures Tg1 and Tg2 of refrigerant, detected by the corresponding first and second refrigerant temperature sensors 59 and 61, which flows into first and second internal heat-exchangers 29 and 31 are watched. If the refrigerant temperature Tg1 of first internal heat-exchanger 29 side is greater than that Tg2 of second heat-exchanger 31 side, first bidirectional valve 33 of greater refrigerant temperature Tg1 side is closed and second bidirectional valve 35 of smaller refrigerant temperature Tg2 side is opened. The open/close relationship of first and second bidirectional valves 33 and 35 is reverse to that in the case wherein the required capacities of first and second internal units B1 and B2 are different from one another. However, if refrigerant temperatures Tg1 and Tg2 are equal to one the other, first and second bidirectional valves 33 and 35 are opened. The capacity of compressor 21 and the heating amount of refrigerant heating device 51 are controlled based on the total of the required capacities of first and second internal units B1 and B2 in step ST23. The absolute value $\Delta$Tg the difference between the refrigerant temperatures Tg1 and Tg2 is found in step ST24, and a degree of opening of flow rate control valve 39 is regulated to adjust the absolute valve $\Delta$Tg at zero in step ST25. Thus, a suitable amount of refrigerant is respectively provided to first and second internal heat-exchangers 29 and 31. After that, the above-described steps ST7 and ST6 are executed.

Figure 4:
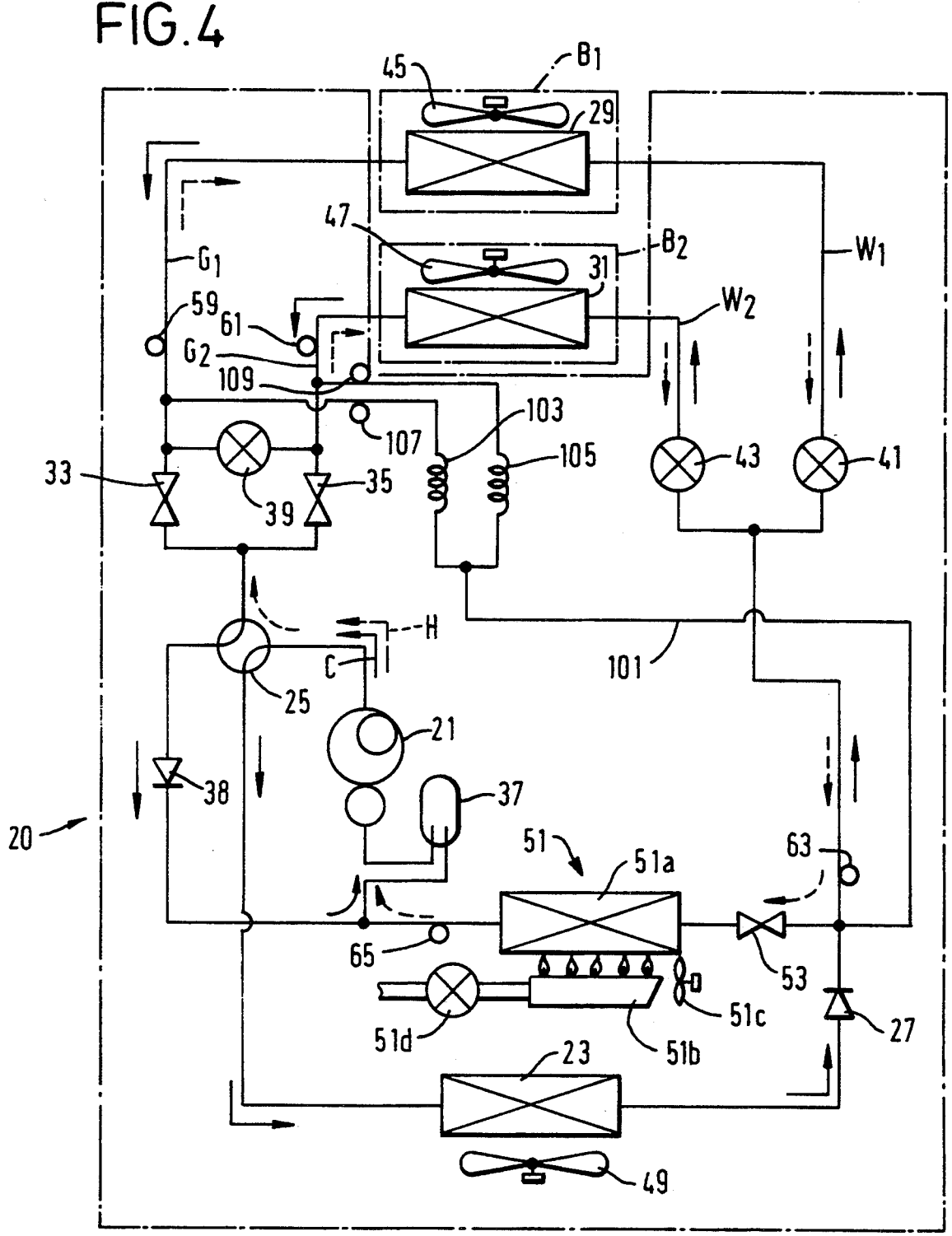
FIG. 4 is a diagram of a modification of the first embodiment.

In the above-described first embodiment, refrigerant evaporation temperatures Tc1 and Tc2 are directly detected by first and second heat-exchanger temperature sensors 55 and 57 directly mounted on the corresponding first and second heat-exchangers 29 and 31. However, as shown in FIG. 4, refrigerant evaporation temperatures Tc1 and Tc2 may be detected indirectly. One of the ends of a bypass pipe 101 is connected to the connecting point between third bidirectional valve 53 and check valve 27. The other end of bypass pipe 101 is bifurcated wherein one is connected to first gas flow pipe G1 through a first capillary tube 103 and the other is connected to second gas flow pipe G2 through a second capillary tube 105. Refrigerant temperature sensors 107 and 109 are respectively mounted on each bifurcated pipes. Thus, saturated refrigerant temperatures Ts1 and Ts2 ape detected by refrigerant temperature sensors 107 and 109. Such saturated refrigerant temperatures Ts1 and Ts2 may be used, instead of refrigerant evaporation temperatures Tc1 and Tc2.

Figure 5:
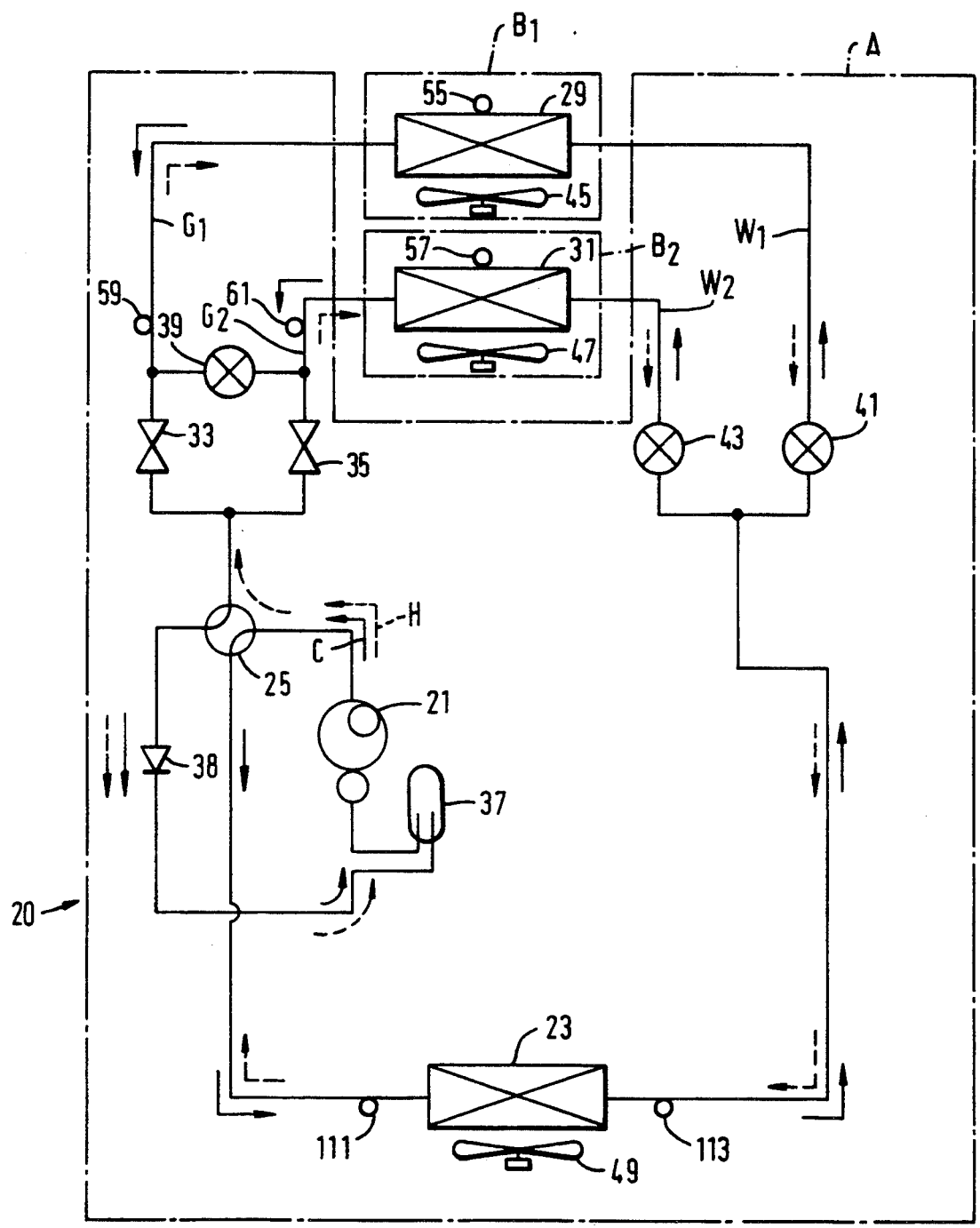
FIG. 5 is a diagram illustrating a refrigerating circuit of a second embodiment of the present invention.
Figure 6:
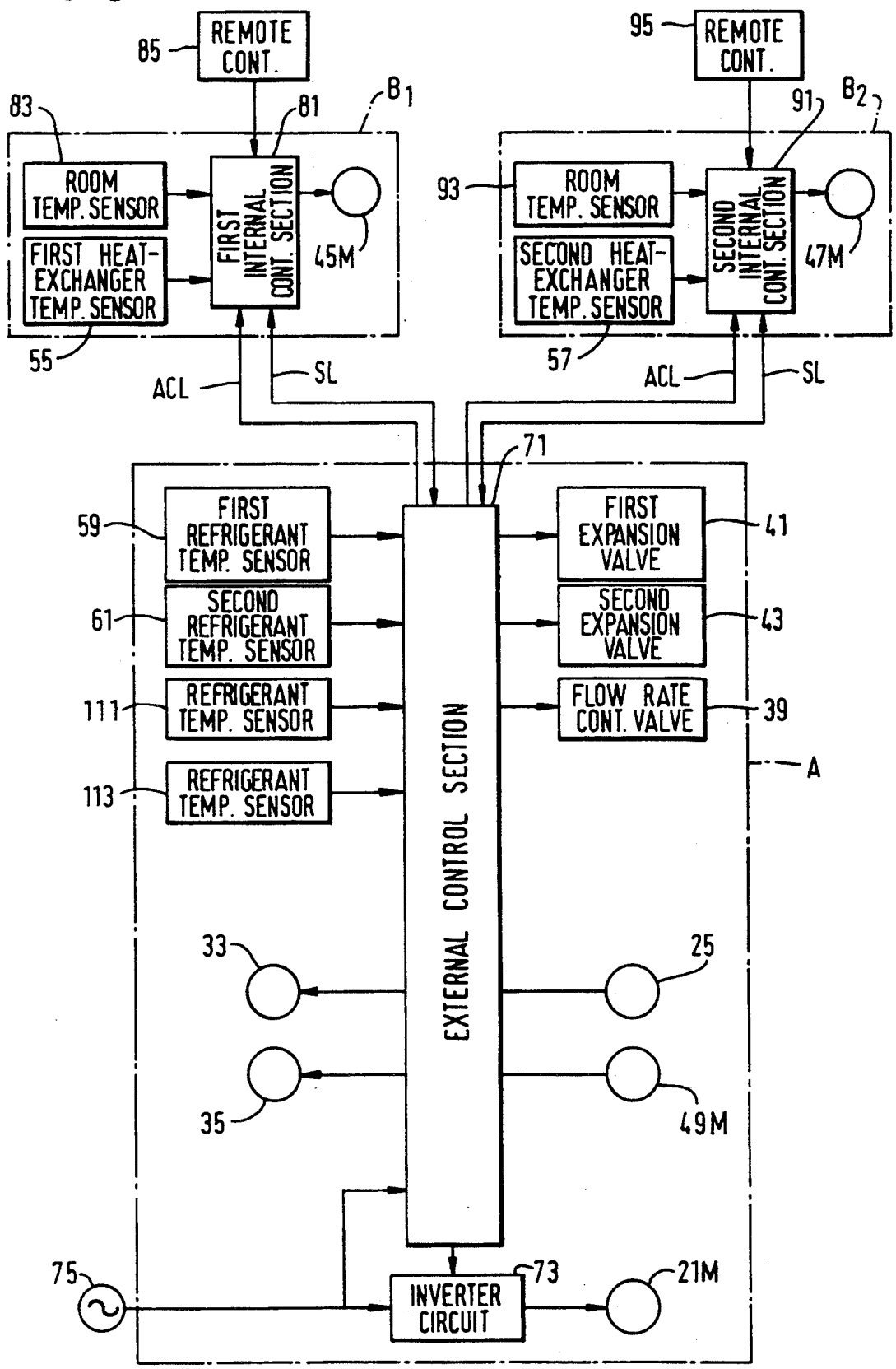
FIG. 6 is a block diagram of a control circuit of the second embodiment.

A second embodiment of the present invention will be now described in more detail with reference to FIGS. 5 and 6. In this second embodiment, refrigerant heating device 51 shown in FIG. 1 is eliminated and refrigerant temperature sensors 111 and 113 are respectively arranged at input and output sides of external heat-exchanger 23 to detect the refrigerant super heating of external heat-exchanger 23. A heating operation is carried out with heat absorbed from the external atmosphere by refrigerant flowing through external heat-exchanger 23, and the refrigerant super heating of external heat-exchanger 23 is regulated at a constant value during the heating operation. Only the above-described processes of the heating operation are different as compared with that of the above-described first embodiment. Thus, same numerals are applied to similar elements between FIGS. 1 and 2 and FIGS. 5 and 6 and detailed descriptions thereof are not repeated.

A third embodiemnt of the invention will be described with reference to FIGS. 7, 8, 9(A) and 9(B). In this embodiment, flow rate control valve 39 shown in FIG. 1 is eliminated and first and second flow rate control valves 121 and 123 (variable opening valves) are respectively provided in first and second gas flow pipes G1 and G2, instead of first and second bidirectional valves 33 and 35.

Figure 8:
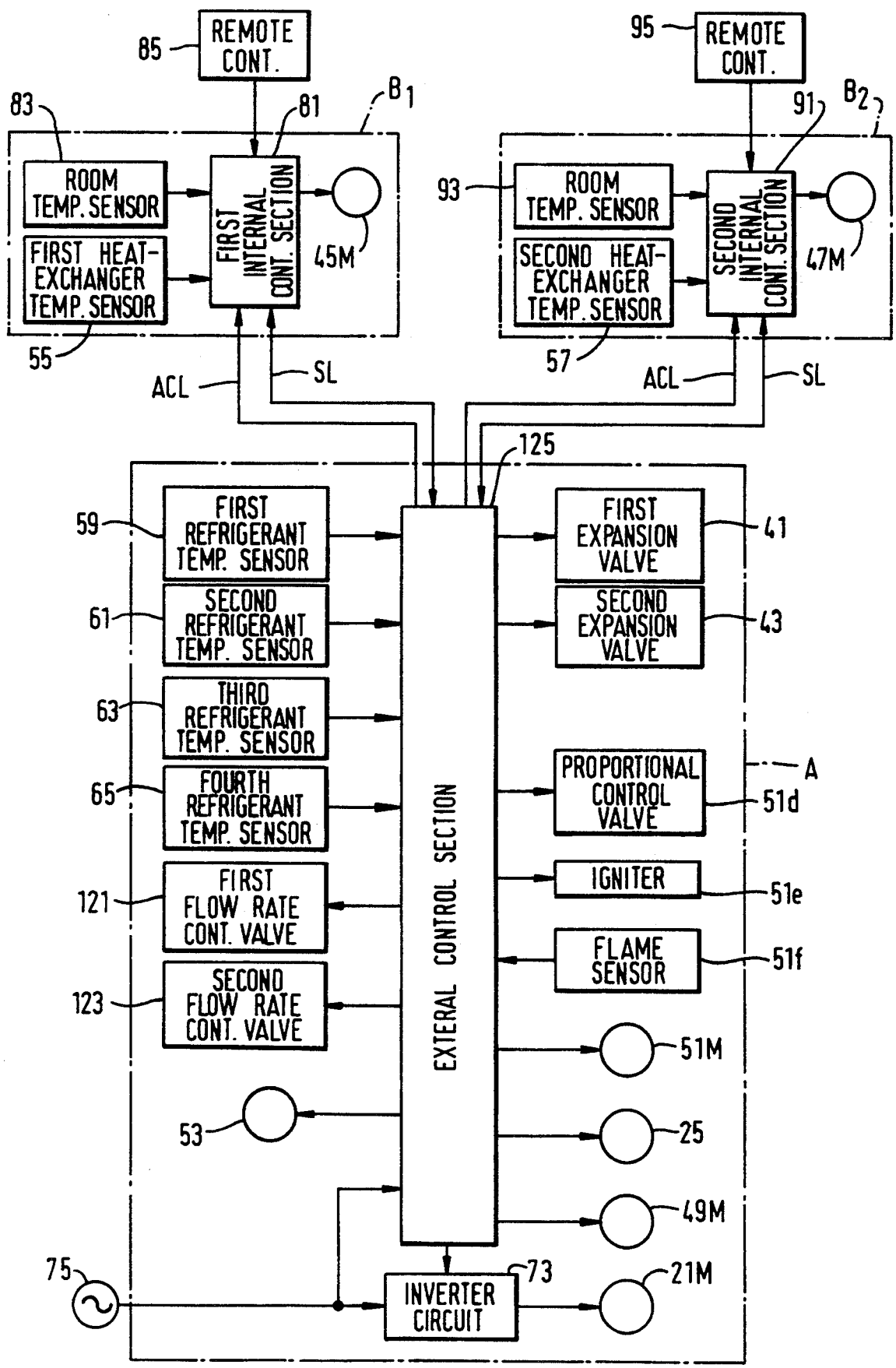
FIG. 8 is a block diagram of a control circuit of the third embodiment.

In this embodiment, an external control section 125 shown in FIG. 8 carries out following functions;

1. First main function carrying out a cooling operation based on a cooling operation command from first and second internal units B1 and B2 wherein refrigerant fed from compressor 21 flows through four-way valve 25, external heat-exchanger 23, check valve 27, first and second electronic expansion valves 41 and 43, first and second internal heat-exchangers 29 and 31, first and second flow rate control valves 121 and 123, four-way valve 25, check valve 38 and accumulator 37;

2. Second main function which controls the capacity of compressor 21 in accordance with the total amount of the required capacities of first and second internal heat-exchangers B1 and B2 in the cooling operation;

3. Third main function which fully opens one of the first and second flow rate control valves, e.g., 121 corresponding to one of the first and second internal units, e.g., B1 having a greater required capacity compared with that of second internal unit B2, and a degree of opening of the other flow rate control valve 123 corresponding to second internal unit B2 having a smaller required capacity is controlled so that a difference (or ratio) between refrigerant evaporation temperatures Tc1 and Tc2 of first and second internal heat-exchangers 29 and 31 is regulated at a prescribed value according to the required capacities of first and second internal units B1 and B2 (i.e., a value corresponding to a difference or a ratio between the required capacities of first and second internal units B1 and B2) in the cooling operation;

4. Fourth main function which detects a refrigerant super heating of each of first and second internal heat-exchangers 29 and 31 in the cooling operation;

5. Fifth main function controlling a degree of opening of first and second electronic expansion valves 41 and 43 to adjust each detected refrigerant super heating to a constant value;

6. Sixth main function which carries out a heating operation in response to the heating operation mode command from first and second internal units B1 and B2 wherein refrigerant fed from compressor 21 flows through four-way valve 25, first and second flow rate control valves 121 and 123, first and second internal heat-exchangers 29 and 31, first and second electronic expansion valves 41 and 43, third bidirectional valve 53, refrigerant heating device 51 and accumulator 37;

7. Seventh main function which controls the capacity of compressor 21 (the output frequency of inverter circuit 73); the heating amount of refrigerant heating device 51 (an amount of combustion of gas burner 51b) according to a total of required capacities of first and second internal units B1 and B2 in the heating operation;

8. Eighth main function which fully opens one of the first and second flow rate control valves, e.g., 121 corresponding to one of the first and second internal units, e.g., B1 having a greater required capacity compared with that of second internal unit B1 and regulates a degree of opening of second flow rate control valve 123 corresponding to second internal unit B2 having a smaller required capacity so that a difference (or a ratio) between the temperatures of refrigerant Tg1 and Tg2, detected by first and second refrigerant temperature sensors 59 and 61, which flows into respective first and second internal heat-exchangers 29 and 31 is adjusted to a prescribed value based on the required capacities of first and second internal units B1 and B2 (i.e., a value corresponding to a difference or a ratio of the required capacities) in the heating operation;

9. Ninth main function detecting a refrigerant super heating of heat-exchanger 51a of refrigerant heating device 51 (a difference between detected temperatures of third and fourth refrigerant temperature sensors 63 and 65) in the heating operation; and 10. Tenth main function simultaneously controlling a degree of opening of first and second electronic expansion valves 41 and 43 at a same amount to adjust the detected refrigerant super heating at a constant value.

Other constructions of the third embodiment are similar to that in the first embodiment shown in FIGS. 1 and 2. Thus, the same numerals in FIGS. 1 and 2 are applied to similar elements in FIGS. 7 and 8 and detailed descriptions thereof are not repeated.

Figure 9B:
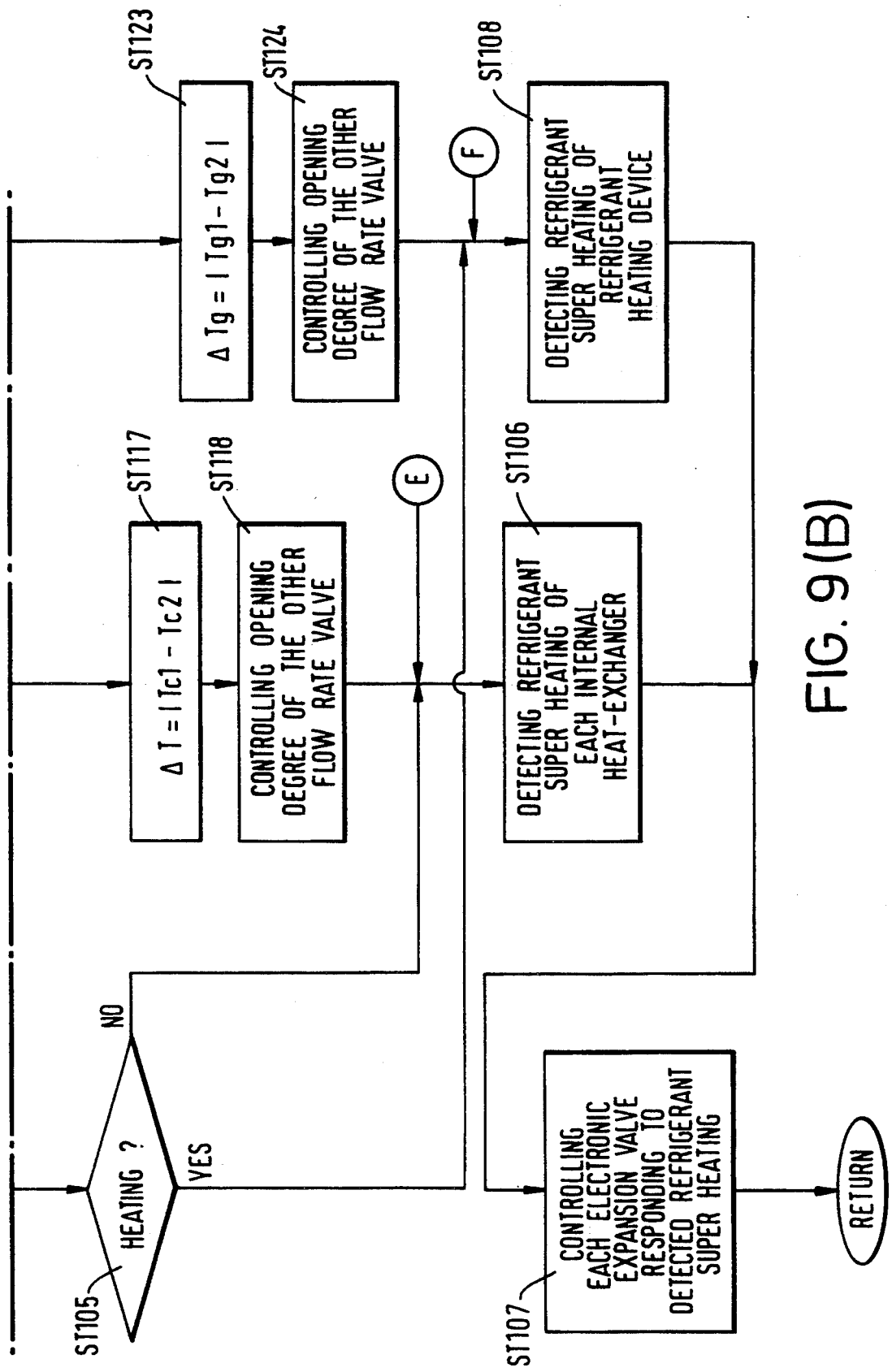
Figure 9C:
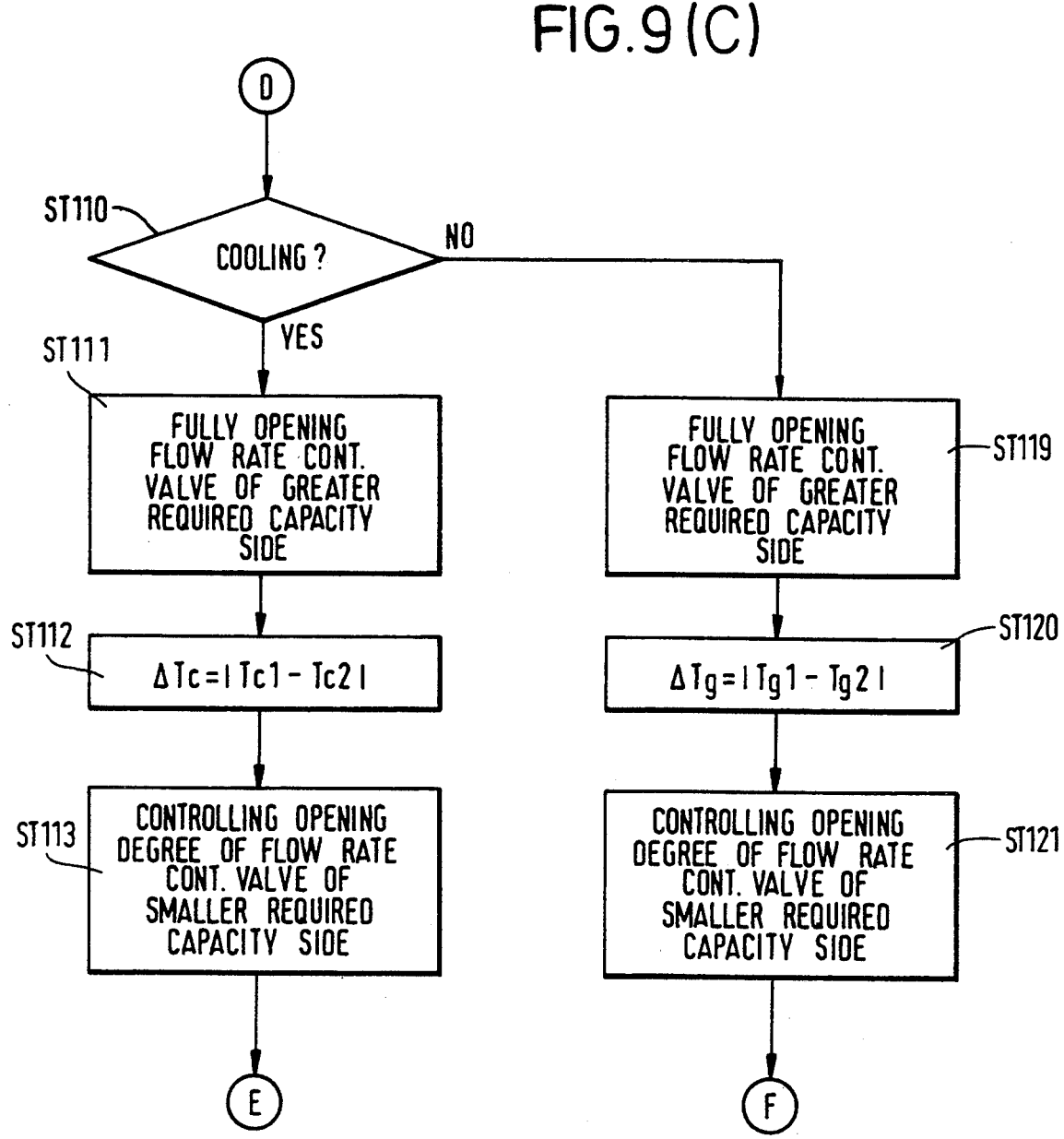

The operation of the above-described third embodiment will now be described with reference to FIGS. 9(A) and 9(B).

A first operation mode of this embodiment will be described supporsing that a cooling operation mode and a desired room temperature are set in first internal unit B1 through operation remote controller 85 and second internal unit B2 is stopped.

In step ST101, since the operation of first internal unit B1 is requested, the NO-path is taken. First flow rate control valve 121 corresponding to first internal unit B1 (operation side) is opened and second flow rate control valve 123 corresponding to second internal unit B2 (stop side) is closed in step ST102. Compressor 21 is driven and refrigerant fed from compressor 21 flows through four-way valve 25, external heat exchanger 23, first electronic expansion valve 41, first internal heat-exchanger 29, first flow rate control valve 121, four-way valve 25, check valve 38 and accumulator 37 in the direction indicated by a solid arrow C in FIG. 7. In this single cooling operation, the capacity of compressor 21 is controlled in response to the required capacity of first internal unit B1 in step ST103 and a degree of opening of first flow rate control valve 121 is also controlled in accordance with the required capacity of first internal unit B1 in step ST104. In step ST105, since a cooling operation is set in first internal unit B1, the NO-path is taken. The refrigerant super heating of first internal heat-exchanger 29 (a difference between detected temperatures of first heat-exchanger temperature sensor 55 and refrigerant temperature sensor 59) is detected in step ST106 and a degree of opening of first electronic expansion valve 41 is controlled to adjust the detected refrigerant super heating at a constant value in step ST107.

A second operation mode will be described supposing that a heating operation mode and a desired room temperature are set in first internal unit B1 and second internal unit B2 is stopped. In step ST101, the NO-path is taken. In step ST102, first flow rate control valve 121 is opened and second flow rate control valve 123 is closed. In step ST103, the capacity of compressor 21 is controlled in accordance with the required capacity of first internal unit B1 and the heating amount of refrigerant heating device 51 is controlled on the basis of the required capacity of first internal unit B1 in the single heating operation. In step ST104, a degree of opening of first flow rate control valve 121 is controlled based on the required capacity of first internal unit B1. In step ST105, since a heating operation is set in first internal unit B1, the YES-path is taken. The refrigerant super heating of heat exchanger 51a of refrigerant heating device 51 (a difference between the detected temperatures of third and fourth refrigerant temperature sensors 63 and 65) is detected in step ST108 and a degree of opening of first electronic expansion valve 41 is controlled to adjust the detected refrigerant super heating at a constant value in step ST107.

A third operation mode will be described supposing that a cooling operation mode and a desired room temperature are set in first and second internal unit B1 and B2, and the desired room temperature of first internal unit B1 is different from that of second internal unit B2. In step ST101, since a cooling operation is set in both first and second internal units B1 and B2, the YES-path is taken. The NO-path is taken in step ST109. The YES-path is taken in step ST110. In step ST111, a degree of opening of one of the flow rate control valves, e.g., 121 is fully opened if the required capacity of first internal unit B1 is greater than that of second internal unit B2. Compressor 21 is driven and refrigerant fed from compressor 21 flows through four-way valve 25, external heat-exchanger 23, first and second electronic expansion valves 41 and 43, first and second internal heat-exchangers 29 and 31, first and second flow rate control valves 121 and 123, four-way valve 25, check valve 38 and accumulator 37 in the direction indicated by a solid arrow C in FIG. 7. In this parallel cooling operation, the capacity of compressor 21 is controlled based on the total amount of the required capacities of first and second internal units B1 and B2.

Figure 7:
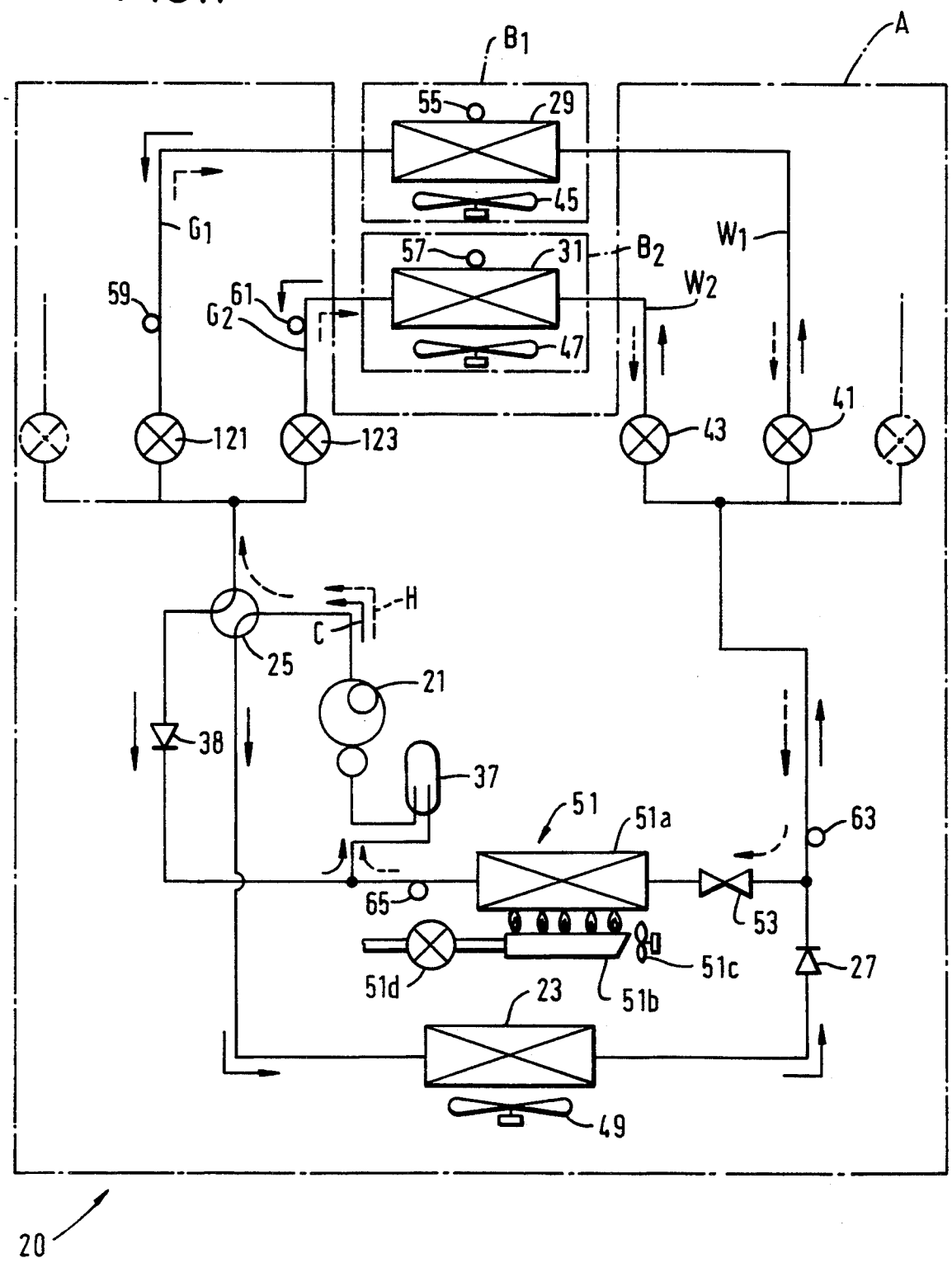
FIG. 7 is a diagram of a third embodiment of the present invention.

In step ST112, the absolute valve ΔTc of a difference between a refrigerant evaporation temperature Tc1 of first internal heat-exchanger 29 detected by first heat-exchanger temperature sensor 55 and a refrigerant evaporation temperature Tc2 of second internal heat-exchanger 31 detected by second heat-exchanger temperature sensor 57 is obtained. In step ST113, a degree of opening of flow rate control valve 123 corresponding to second internal unit B2 having a smaller required capacity compared with first internal unit B1 is controlled to adjust the absolute valve ΔTc at a prescribed value corresponding to a ratio of the required capacities of first and second internal units B1 and B2. Thus, the amount of refrigerant flowing through second heat-exchanger 31 of second internal unit B2 having a smaller required capacity is adjusted at a suitable value corresponding to the required capacity of second internal unit B2. Also, the amount of refrigerant flowing through first heat-exchanger 29 is regulated at a suitable value corresponding to the required capacity of first internal unit B1. After step ST113 is executed, the above-described steps ST106 and ST107 are executed. The refrigerant super heatings of first and second heat-exchangers 29 and 31 are detected and a degree of opening of first and second electronic valves 41 and 43 are respectively controlled to adjust the above-described detected refrigerant super heatings at corresponding constant values. At this time, since a sufficient amount of refrigerant flows through first heat-exchanger 29 of first internal unit B1 having a greater required capacity, the control of the refrigerant super heating is effectively carried out by first electronic expansion valve 41 and the refrigerant super heating of first heat-exchanger 29 is always maintained at a constant value. Furthermore, since a sufficient amount of refrigerant flows through second heat-exchanger 31 of second internal unit B2 having a smaller required capacity, the control of the refrigerant super heating by second electronic expansion valve 43 is effectively carried out and thus, the refrigerant super heating of second heat-exchanger 31 is maintained at a constant value. As a result, the operation of the refrigerating circuit shown in FIG. 7 is stable and an appropriate cooling capacity can be obtained.

A fourth operation mode will be described supposing that required capacities of first and second internal units B1 and B2 are equal to one the other. In this case, the YES-path is taken in step ST109. In step ST114, the YES-path is taken. The capacity of compressor 21 is controlled through inverter circuit 73 based on the total amount of the required capacities of first and second internal units B1 and B2 in step ST115.

The refrigerant evaporation temperatures Tc1 and Tc2 of first and second internal heat-exchangers 29 and 31 detected by the corresponding first and second heat-exchanger temperature sensors 55 and 57 are watched. If refrigerant evaporation temperature Tc1 of first heat-exchanger 29 is greater than that Tc2 of second heat-exchanger 31, the degree of opening of first flow rate control valve 121 is maintained at its present value and the degree of opening of second flow rate control valve 123 corresponding to second internal heat-exchanger 31 whose refrigerant evaporation temperature Tc2 is small is regulated so that the absolute valve ΔTc of a difference between refrigerant evaporation temperatures Tc1 and Tc2 is substantially zero in steps ST116, ST117 and ST118. After that, the above-described steps ST106 and ST107 are executed. The refrigerant super heatings of first and second internal heat-exchangers 29 and 31 are detected in step ST106. A degree of opening of each first and second electronic expansion valves 41 and 43 is controlled based on the detected refrigerant super heating to regulate the corresponding refrigerant super heatings at a constant value in step ST107.

A fifth operation mode will be described supposing that a heating operation mode and a different desired room temperature are set in respective first and second internal units B1 and B2 and the required capacity of first internal unit B1 is greater than that of second internal unit B2. In this case, the NO-path is taken in step ST110. First flow rate control valve 121 corresponding to first internal unit B1 having a greater required capacity compared with second internal unit B2 is fully opened in step ST119. Compressor 21 is driven and refrigerant fed from compressor 21 flows through four-way valve 25, first and second flow rate control valves 121 and 123, first and second internal heat-exchangers 29 and 31, first and second electronic expansion valves 41 and 43, third bidirectional valve 53, refrigerant heating device 53 and accumulator 37 in the direction indicated by a dotted arrow H in FIG. 7. The capacity of compressor 21 and the heating amount of refrigerant heating device 51 are respectively controlled based on the total of the required capacities of first and second internal units B1 and B2. The absolute valve ΔTg of a difference between the temperature Tg1 of refrigerant flowing into first internal heat-exchanger 29 detected by first refrigerant temperature sensor 59 and the temperature Tg2 of refrigerant flowing into second internal heat-exchanger 31 detected by second refrigerant temperature sensor 61 is found in step ST120. A degree of opening of second flow rate control valve 123 is controlled to adjust the absolute valve ΔTg at a prescribed value corresponding to the ratio of the required capacities of first and second internal units B1 and B2 in step ST121. Thus, the amount of refrigerant flowing into second internal heat-exchanger 31 of second internal unit B2 having a smaller required capacity is set at a sufficient value corresponding to the required capacity of second internal unit B2. As a result, the amount of refrigerant flowing into first internal heat-exchanger 29 of first internal unit B1 having a greater required capacity is also set at an appropriate value corresponding to the required capacity of first internal unit B1. After executing step ST121, the above-described steps ST108 and ST107 are executed. The refrigerant super heating of heat-exchanger 51a of refrigerant heating device 51 (a difference between detected temperatures of third and fourth refrigerant temperature sensors 63 and 65) is detected in step ST108 and a degree of opening of each first and second electronic expansion valves 41 and 43 is simultaneously controlled at a same amount to adjust the detected refrigerant super heating at a constant value in step ST107.

As described above, since a sufficient amount of refrigerant always flows into first and second internal units B1 and B2, a problem in which a large amount of liquidized refrigerant stays in one of the first and second internal heat-exchanger corresponding to one of the first and second internal units having a smaller required capacity is avoided. Thus, a sufficient amount of refrigerant can flow through the entire refrigerant circuit. A decrease in a refrigerant temperature in the refrigerating circuit is avoided and thus a sufficient heating capacity can be obtained. In addition, since the shortage of the amount of refrigerant circulating the refrigerant circuit does not occur as described above, a great amount of refrigerant may not be charged in the refrigerant circuit beforehand. A liquid tank having large capacity is not needed.

An increase in the external size of the air conditioning apparatus is avoided and an increase in the production cost thereof is also avoided.

A sixth operation mode will be described supporsing that first and second internal units B1 and B2 have the same required capacity and carry out a parallel heating operation. In steps ST101 and ST109, the YES-path is taken. The NO-path is taken in step ST114. The capacity of compressor 21 is controlled through inverter circuit 73 based on the total amount of the required capacities of first and second internal units B1 and B2 in step ST121.

The temperatures Tg1 and Tg2 of refrigerant flowing into each first and second internal heat-exchangers 29 and 31 are watched. If refrigerant temperature Tg1 of first internal heat-exchanger 29 is greater than that Tg2 of second internal heat-exchanger 31, a degree of opening of first flow rate control valve 121 corresponding to first heat-exchanger 29 is maintained at its present value and a degree of opening of second flow rate control valve 123 corresponding to second internal heat-exchanger 31 whose refrigerant temperature is small is regulated so that the absolute valve ΔTg of a difference between refrigerant temperatures Tg1 and Tg2 is substantially zero in steps ST122 and ST123 and ST124. As a result, an appropriate amount of refrigerant is respectively supplied to first and second internal heat-exchangers 29 and 31. After that, the above-described steps ST108 and ST107 are executed. The refrigerant super heating of heat-exchanger 51a of refrigerant heating device 51 is detected in step ST108. A degree of opening of each first and second electronic expansion valves 41 and 43 is controlled based on the detected refrigerant super heating to adjust the detected refrigerant super heating at a constant value in step ST107.

In the above-described embodiment, refrigerant evaporation temperatures Tc1 and Tc2 of first and second internal heat-exchangers 29 and 31 are detected by the corresponding first and second heat-exchanger temperature sensors 55 and 57. However, the refrigerant evaporation temperatures Tc1 and Tc2 may be displaced with the saturated refrigerant temperatures Ts1 and Ts2 as shown in FIG. 4. Furthermore, refrigerant heating device 51 is used to carry out a heating operation in the third embodiment. However, refrigerant heating device 51 may be eliminated as shown in FIG. 5 and the heating operation may be carried out with heat absorbed from the external atmosphere by refrigerant.

With the above-described present invention, since each refrigerant super heating of first and second internal heat-exchangers 29 and 31 is maintained at a constant value with accuracy in the cooling operation, an appropriate cooling capacity can be obtained. In the heating operation, an appropriate heating capacity can be obtained without increasing the external size of the air conditioning apparatus and the power consumption.

The present invention has been described with respect to specific embodiments. However, other embodiments based on the principles of the present invention should be obvious to those of ordinary skill in the art. Such embodiments are intended to be covered by the claims.

What is claimed is:

1. A multiple type air conditioning apparatus comprising:
   a refrigerant supply unit having a variable capacity compressor, a four-way valve connected to its output, an external heat-exchanger connected to a port of the four-way valve and a fan device associated with the external heat-exchanger;
   at least two air conditioning units each having a heat-exchanger and fan device associated with each heat-exchanger, the heat-exchangers of the at least two air conditioning units being connected in parallel to one another and each connected to the compressor through the four-way valve, each heat-exchanger producing a variable refrigerant evaporation temperature and variable refrigerant super heating when refrigerant flows therethrough,
   means for controlling each air conditioning unit respectively at a required capacity;
   first variable expansion valve means for variably throttling refrigerant, fed from the compressor through the external heat exchanger, flowing through one of the heat-exchangers of the at least two air conditioning units;
   second variable expansion valve means for variably throttling refrigerant, fed from the compressor through the external heat exchanger, flowing through the other heat-exchanger of the at least two air conditioning units;
   variable flow rate control means arranged at an opposite side of the heat-exchangers of the at least two air conditioning units from which the first and second variable expansion valve means are connected for regulating a distribution of refrigerant flowing into each heat-exchanger of the at least two air conditioning units;
   mean control means for controlling the capacity of the compressor based on the total amount of the required capacities of the at least two air conditioning units; and
   wherein the variable flow rate control means includes a flow rate control valve connected between the heat-exchangers of the at least two air conditioning units, a first bidirection valve means connected between the four way valve and one of the heat-exchangers of the at least two air conditioning units and wherein the flow rate control valve allows refrigerant to flow through the one of the heat-exchangers and a second bidirectional valve means connected between the four way valve and the other heat-exchanger and wherein the variable opening valve allows refrigerant to flow through the other heat-exchanger.

2. An apparatus according to claim 1 further comprising refrigerant heating means for heating refrigerant in a heating operation, the refrigerant heating means including a heat-exchanger into which refrigerant flows, the heat-exchanger of the refrigerant heating means producing refrigerant super heating when refrigerant flows therethrough.

3. An apparatus according to claim 2 further comprising means for detecting the refrigerant super heating of a heat-exchanger of the refrigerant heating means in the heating operation, and a main control means including, means for carrying out the heating operation wherein refrigerant fed from the compressor flows through the four-way valve, the first and second bidirectional valve means, the flow rate control valve, the heat-exchangers of the at least two air conditioning units, the first and second variable expansion valve means, and the refrigerant heating means, means for opening the one of the first and second bidirectional valve means corresponding to one of the at least two air conditioning units having a greater required capacity as compared with that of the other air conditioning unit and for closing the other bidirectional valve means corresponding to the other air conditioning unit having a smaller required capacity in the heating operation, means for controlling the amount of heating of the refrigerant heating means based on the total amount of the required capacities of the at least two air conditioning units in the heating operation, means for regulating the degree of opening of the flow rate control valve so that temperatures of refrigerant flowing into the respective heat-exchangers of the at least two air conditioning units have a prescribed relationship based on the required capacities of the at least two air conditioning units in the heating operation, first and second variable expansion valve means connected respectively to the heat-exchangers of the at least two air conditioning units; and means for respectively regulating the degree of opening of the first and second variable expansion valve means so that the detected refrigerant super heating of the heat-exchanger of the refrigerant heating means is adjusted at a constant value in the heating operation.

4. An apparatus according to claim 3 further including means for respectively detecting the refrigerant evaporation temperatures of the heat-exchangers of the at least two air conditioning units in a cooling operation, and means for respectively detecting the refrigerant super heatings of the heat-exchangers of the at least two air conditioning units in the cooling operation, the main control means including, means for carrying out the cooling operation wherein refrigerant fed from the compressor flows through the four-way valve, the heat-exchanger of the refrigerant supply unit, the first and second variable expansion valve means, the heat-exchangers of the at least two air conditioning units, the variable opening valve and the first and second bidirectional valve means, means for opening one of the first and second bidirectional valve means corresponding to one of the at least two air conditioning units having a greater required capacity as compared with that of the other air conditioning unit and for closing the other bidirectional valve means corresponding to the other air conditioning unit having a smaller required capacity in the cooling operation, means for regulating a degree of opening of the variable opening valve so that the detected refrigerant evaporation temperatures have a prescribed relationship based on the required capacities of the at least two air conditioning units in the cooling operation, and means for respectively regulating a degree of opening of the first and second variable expansion valve means so that the detected refrigerant super heatings of the heat-exchangers of the at least two air conditioning units are adjusted at a respective constant value in the cooling operation.

5. An apparatus according to claim 1 further including means for respectively detecting the refrigerant evaporation temperatures of the heat-exchangers of the at least two air conditioning units in a cooling operation, and means for respectively detecting the refrigerant super heatings of the heat-exchangers of the at least two air conditioning units in the cooling operation, the main control means including means for carrying out the cooling operation wherein refrigerant fed from the compressor flows through the four-way valve, the external heat-exchanger, the first and second variable expansion valve means, the heat-exchangers of the at least two air conditioning units, the variable opening valve and the first and second bidirectional valve means, means for opening one of the first and second bidirectional valve means corresponding to one of the at least two air conditioning units having a greater required capacity as compared with that of the other air conditional unit and for closing the other bidirectional valve mans corresponding to the other air conditioning unit having a smaller required capacity in the cooling operation, means for regulating a degree of opening of the variable opening valve so that the detected refrigerant evaportion temperatures have a prescribed relationship based on the required capacities of the at least two air conditioning units in the cooling operation, and means for respectively regulating a degree of opening of the first and second variable expansion valve means so that the detected refrigerant super heatings of the heat-exchangers of the at least two air conditioning units are adjusted at a respective constant value in the cooling operation.

6. An apparatus according to claim 5, wherein a heat-exchanger of a refrigerant heating means of the refrigerant supply unit produces a refrigerant super heating when in a heating operation, the main control means including, means for carrying out the heating operation wherein refrigerant fed from the compressor flows through the four-way valve, the first and second bidirectional valve mans, the variable opening valve, the heat-exchangers of the at least two air conditioning units, the first and second variable expansion valve means and said heat-exchanger of the refrigerant supply unit, means for opening one of the first and second bidirectional valve means corresponding to one of the at least two air conditioning units having a greater required capacity as compared with that of the other air conditioning unit and for closing the other bidirectional valve means corresponding to the other air conditioning unit having a smaller required capacity in the heating operation, means for regulating a degree of opening of the variable opening valve so that temperatures of refrigerant respectively flowing into the heat-exchangers of the at least two air conditioning units have a prescribed relationship based on the required capacities of the at least two air conditioning units in the heating operation, and means for respectively regulating a degree of opening of first and second variable expansion valve means so that the detected refrigerant super heating of said heat-exchanger of the refrigerant supply unit is adjusted at a constant value in the heating operation.

* * * * *